Patented Apr. 15, 1947

2,419,020

UNITED STATES PATENT OFFICE 2,419,020

CALCIUM TARTRATE RECOVERY PROCESS

Ralph A. Hales, West Chester, Pa., assignor to Atlas Powder Company, Wilmington, Del., a corporation of Delaware No Drawing. Application October 23, 1944, Serial No. 560,023

2 Claims. (Cl. 260—528)

This application relates to the recovery of oxalic acid values and the recovery of tartaric acid values from solutions.

An object of the invention is the separation of tartaric acids in the form of calcium tartrates from solutions containing them.

A further object is the separation of oxalic and tartaric acid values as calcium salts from solutions containing them.

Another object is the separation of oxalic acid and tartaric acid values from solutions containing these acids and less highly oxidized acid materials derived from the oxidation of carbohydrate materials, and more particularly of glucose.

Still another object is the removal of oxalic acid as such and as calcium oxalate and the removal of tartaric acids in the form of calcium tartrates from solutions containing tartaric and oxalic acids.

Other objects will be apparent from the following description.

It is known that, under proper conditions, carbohydrate materials may be oxidized in aqueous solution by means of nitric acid in the presence of a catalyst to produce tartaric acids. The oxidation is, however, quite complex and, in addition to producing tartaric acids, simultaneously produces oxalic acid and a mixture of intermediate or residue acids of lower stages of oxidation than tartaric acid.

The efficient and economic removal of tartaric acids from the oxidized mixture has been a source of much difficulty. The only precipitation method which has heretofore had any success has been one employing a zinc precipitant to bring down the tartaric acids in the form of zinc tartrates. This method has however proven prohibitively expensive because of the high cost of zinc precipitants.

Numerous other precipitants have been suggested for this process, but in no case has it heretofore been possible by their use to produce precipitates of a sufficiently pure dense granular nature for satisfactory handling and use. Rather, other precipitants have resulted in the production of wholly unsatisfactory, impure, and gummy precipitation masses.

According to the present invention an efficient method is provided by which a calcium precipitant is employed to separate tartaric acids, and, when it is present, oxalic acid, from the other acids resulting from a carbohydrate oxidation; yet the method of the present invention results in the production of pure granular precipitates which are useful and easily filterable. Thus for the first time, a precipitation procedure is provided which does not require expensive zinc precipitants.

When oxalic and tartaric acids are both present in the oxidized carbohydrate solution, removal of both these acids may be obtained, either with or without a preliminary removal of a portion of the oxalic acid by cooling, by removal of oxalic acid with a calcium precipitant and a following removal of tartaric acids also with a calcium precipitant.

The calcium precipitation process of the present invention will be made clear to those skilled in the art by the following particular description.

To separate oxalic acid and tartaric acids from an oxidized aqueous carbohydrate solution, according to the present invention, it is usually desirable first to remove some of the oxalic acid present, as such.

Oxalic acid in the form of the crystalline dihydrate is not highly soluble in the cold, and a large proportion may be removed by merely cooling the solution. It is usually preferred to remove as much as possible by this means because the acid is recovered as such and precipitant is saved to the extent that any acid is removed without its use. However, the entire oxalic acid content may be removed with precipitant if desired.

The most desirable degree of cooling for the removal of oxalic acid as such depends upon the economic balance between the cost of cooling and the value of oxalic acid as compared with calcium oxalate. Temperatures between about 0° C. and 10° C. have been found to be usually entirely satisfactory.

During the oxalic acid crystallization, the solution should be regulated to as high a concentration as will permit ready filtration, for oxalic acid is considerably more soluble in dilute solution of the residual acids than in concentrated solution. A specific gravity of about 1.30 has been found desirable for this step, but this value is not critical.

Following crystallization of that portion of the oxalic acid content which will crystallize on cooling, the solution may be filtered or otherwise separated from the oxalic acid crystals and the last portion of the oxalic acid removed. This may be accomplished by adding a calcium precipitant to precipitate calcium oxalate. In order to provide for more ready filtration, it is often desirable that the solution be diluted before the precipitation and removal of calcium oxalate.

A specific gravity of about 1.20 has been found to be quite effective for this step, but again this is not critical.

Before precipitating residual oxalic acid and the tartaric acids content from the solution, it is desirable that a preliminary determination of the amounts of these acids and of the residue acids present be made in order that the proper amounts of precipitant may be discovered. This preliminary determination is conveniently accomplished by means of a zinc precipitation performed on a sample of the solution from which acids are to be removed. Such a precipitation may be carried out as follows:

A sample of the filtrate and wash liquor from the oxalic acid dihydrate crystallization may be heated to 50° C. and the remaining oxalic acid precipitated by addition of zinc carbonate in increments until no further precipitation occurs immediately after addition and the excess basic zinc carbonate dissolves. Then the mixture may be kept at 65° C. for a period of about one half hour with constant agitation at a medium rate. The precipitated zinc oxalate may then be removed by filtration and the cake washed with hot water.

The combined filtrate and washings from the zinc oxalate precipitation may then be heated to 50° C. and the tartaric acids precipitated by addition of zinc carbonate in increments until no further precipitation occurs after addition. This precipitation is considerably slower than is the precipitation of zinc oxalate and a large excess of zinc carbonate is required. The mixture may be kept for a period of about one hour at 65° C. with continued agitation at a medium rate. The precipitated zinc tartrate may then be removed by filtration and the cake washed with hot water.

The oxalic and tartaric acid contents of the precipitate should then be determined by ignition of the zinc oxalate and zinc tartrate cakes and calculation from the zinc oxide content of the residues from the ignition.

The amount of residue acids is easily determined by finding the acid equivalent of another sample of filtrate and wash liquors from the oxalic acid dihydrate crystallization by hot titration with a phenolphthalein indicator. Titration is best performed hot to break up any lactones in the solution and thereby obtain a sharper and truer end point. Subtraction of the acid equivalents precipitated in the zinc oxalate and zinc tartrate precipitations from the equivalents obtained by titration will then give the equivalents of residue acids present.

The oxalic acid remaining after crystallization of oxalic acid dihydrate, according to present process, is removed by adding an amount of calcium precipitant at least equivalent to the oxalic acid content of the solution. An excess is usually desirable and any excess that will not start tartrate precipitation is usually permissible. Excesses as high as 100% of the amount necessary to provide equivalents for all the oxalic acid present usually may be used. For best results, the precipitating solution should be agitated at about 40° C. to 80° C. for at least about a half hour to bring down the calcium oxalate precipitate, which is then easily removed from the solution, as by centrifuging or filtration.

After the oxalic acid has been removed from the solution, it is in condition for the separate precipitation of calcium tartrates. The chief problem in connection with the removal of calcium tartrates, is the obtention of a pure granular precipitate. The residue acids have a strong solubilizing effect on calcium tartrates and tend to hold them in solution until so much precipitant has been added that an impure gummy mass of mixed tartrates and residue acid salts comes down. The process of the present invention makes possible precipitation of relatively pure calcium tartrates in desired dense granular form.

In accordance with the present invention, calcium tartrates are precipitated from the oxidized carbohydrate solution from which oxalic acid has been removed by first adjusting the specific gravity of the solution and then adding a definite excess of calcium precipitant.

The specific gravity of the solution from which precipitation takes place is important. The solvent effect of the residue acids on calcium tartrate has been found to be particularly pronounced in concentrated solutions, making difficult the obtention of pure dense granular precipitates. Specific gravities of the solution, before addition of precipitant, higher than about 1.15 are usually undesirable. On the other hand, specific gravities lower than about 1.05 are usually impractical as the solution becomes so dilute that complete precipitation cannot be obtained, and also large amounts of water must be removed later if the residue acids are to be re-worked. Values of about 1.1 have been found to be optimum.

The excess precipitant is necessary to produce the desired type of precipitation, and the minimum excess required bears a direct relation to the quantities of residue acids present. In general, it will be found that effective precipitation may be achieved if at least enough precipitant is present, over and above the stoichiometric amount necessary to react with all the tartaric acids, to provide a neutralization of at least 20% of the acidity of the residue acids. It is preferred, however, for best results, to neutralize at least about 30% of the acidity of the residue acids. Speed and efficiency of precipitation are aided by increased amounts of precipitant.

On the other hand, too large amounts of precipitant make it exceedingly difficult to obtain a precipitant uncontaminated with salts of residue acids. In general, excesses of precipitant over the amount equivalent to the tartaric acids content, such as to provide more than about 50% neutralization of the residue acids, should be avoided. It is usually preferred to limit such excesses to such that no more than about 35% neutralization of the residue acids takes place.

Temperature and time of precipitation affect to a considerable extent the efficiency of precipitation. Heating seems definitely to hinder residue salt contamination. Too high a temperature, however, results in an undesirable discolored calcium tartrate precipitate. Temperatures as low as about 35° C. and as high as about 80° C. have been found suitable but usually temperatures within the range of from about 60° C. to about 70° C. are to be preferred. Not only should the precipitation preferably be carried out warm but it is usually best to carry it out for a long period of time until it becomes reasonably complete. Solutions containing large amounts of residue acids usually require longer times than do those containing lesser amounts of residue acids. Usually, times of about 35 hours or longer should be employed.

The solution need not be maintained hot during the whole precipitation time; and, in fact, too long heating tends to decompose the residue acids. It has been found that, after about 1 to about 6 hours of heating, little appreciable benefit is obtained from further heating and higher yields are obtained if the heating period is limited to from about 3 to about 6 hours.

Considerable improvement in precipitation and in purity of precipitate is obtained if the heating period is broken up into two or more stages with cooling in between, as for example to room temperature. Such heating stages conveniently may be of about 1 to about 3 hours each. The reason for the improvement effected by stagewise heating is not understood, but precipitation of salts of residue acids is avoided by this treatment. When multiple-stage heating is employed, it is sometimes desirable to add part of the precipitant at each heating stage.

Better results appear to be obtained if during the precipitation vigorous agitation is maintained. Stirring with a high degree of shear, such as may be obtained with an agitating propeller of high speed and small pitch, seems to be particularly desirable. While this action is not completely understood, it is postulated that, without agitation and shear, calcium salts of the residue acids tend to coat the surfaces of calcium tartrate particles which have formed, inhibiting further crystallization of calcium tartrate and promoting the further crystallization of calcium salts of the residue acids. Stirring, particularly with a high degree of shear, perhaps keeps the surfaces of the calcium tartrate crystals clean, permitting their further development free of residue salts.

Seeding the solution with calcium tartrate appears to assist in obtaining the maximum yield. To obtain most effective precipitation relatively large amounts of seed should be used. When the precipitation is carried out with reheating, fresh seed may be introduced at each reheating, or it may be added with an incremental addition of precipitant.

Upon completion of the precipitation, calcium tartrates are filtered or otherwise separated from the solution and dried if desired. The residue acids which remain after removal of the oxalic and tartaric acid values from the solution can be further oxidized to produce more of the desired acids. Sometimes, however, before reoxidation it is desirable to remove excess calcium from the precipitation liquid. Otherwise, some precipitation may take place during the reoxidation. This removal is easily accomplished by precipitating the calcium as an insoluble calcium salt. For example, oxalic acid may be added to precipitate calcium oxalate, or sulfuric acid may be added to precipitate calcium sulphate. It may also be desirable to concentrate the solution before reoxidizing. This is usually best accomplished by evaporation, preferably under a vacuum and rapidly, in an evaporator of small liquor capacity as compared to its heating surface so that a minimum of heat decomposition occurs during evaporation.

According to customary precipitation practice, it will ordinarily be found desirable to wash the calcium oxalate and calcium tartrate precipitate cakes obtained. Instead of using water for this purpose, it has been found advantageous to use hot dilute solutions of oxalic acid for the calcium oxalate cakes and similar solutions of tartaric acid for the calcium tartrate cakes. By this means, undesired acid radicals which may be in the cakes in the form of calcium salts are exchanged for oxalic and tartaric radicals. Wash liquors from the oxalic acid cakes may be added to the next quantity of oxidation solution from which recovery is to be made. Wash liquors from the calcium tartrate cakes may be added to the next liquor from which calcium tartrates are to be removed. Of course, additional precipitant will then be necessary.

As a precipitant in the present process may be used any calcium compound which is sufficiently soluble to permit its convenient use and which, at the same time, does not have anions which have solubilizing effects on the materials to be precipitated. Also, it is preferred to use a precipitant which does not add a corrosive or otherwise undesirable anion to the solution. Usually the preferred precipitant will be lime, for lime has proved eminently satisfactory. Either quicklime or hydrated lime may be used; although hydrated lime is somewhat to be preferred because it is often more easily dissolved. Other calcium precipitants, such as calcium carbonate for example, are also used with advantage. For the precipitation of calcium oxalate, it is often desirable to use calcium tartrate as a precipitating agent. In this way, the tartaric acids content of the solution is enriched, and enriched solutions often make precipitation easier. For this reason it is sometimes desirable to deliberately add tartaric acid to the solution from which calcium tartrates are to be precipitated. Any quantities of calcium tartrates which may have been incorrectly precipitated so that they are not as pure as desired are advantageously re-worked by using them as precipitating agents for calcium oxalate. When calcium tartrate is used as a precipitating agent for calcium oxalate, the amount of precipitant used during calcium tartrates precipitation must be increased accordingly. The value of seeding during the tartrate precipitation is often lessened when enriched solutions are used.

The following example shows the preparation of a liquor from which separation of acids may be made according to the present invention.

EXAMPLE 1

A solution containing 1000 grams of glucose, sufficient residue from a prior oxidation to provide a ratio of residue carbon to glucose carbon of 0.64, 0.15 gram of $Na_3VO_4.16H_2O$ catalyst, 2300 grams of $HNO_3$, and enough water to make 4.2 liters of solution were reacted together at 70° C. for 2 hours. The solution was then concentrated rapidly by passing it in a film through a steamheated tower, and was finally heated at 95° C. until oxide of nitrogen fumes ceased evolving. The resulting liquor was suitable for the recovery process of this invention. This specific oxidation process is more fully set forth and described in Example 2 of co-pending application Serial Number 560,022, filed October 23, 1944, by Robert S. Rose, Jr., and Ralph A. Hales.

The next example demonstrates one embodiment of the recovery process of the present invention.

EXAMPLE 2

*Removal of oxalic acid*

The oxidized solution prepared in Example 1 was cooled to room temperature (25° C.). A crop of oxalic acid crystals separated. Then water was added to the solution, diluting it to a specific gravity of 1.30. The diluted solution was then cooled with continued slow agitation until a temperature of 6° C. was reached. The agitation was then discontinued. The magma was allowed to stand for a few minutes, and most of the supernatant liquor was removed by decantation. The rest of the liquor and the crystals of oxalic acid were separated on a centrifuge and the crystals were washed with water. The wet crystals were removed from the centrifuge and were dried at room temperature. The yield was 534 grams of $H_2C_2O_4.2H_2O$.

Removal of calcium oxalate

The filtrate and wash liquor from the oxalic acid precipitation were diluted with water to a specific gravity of 1.20. The solution was then heated to 50° C. and while stirring there was added 102.4 grams of hydrated lime. This amounted to an 81% excess over the amount theoretically required to react with the oxalic acid. The partially neutralized solution was kept at 65° C. for a period of 1 hour with continued agitation at a medium rate. Precipitated calcium oxalate was then removed by filtration on a vacuum filter and the cake was washed with hot water. The wet cake was dried under vacuum at 70° C. The yield was 111 grams of calcium oxalate monohydrate.

Removal of calcium tartrates

The filtrate and wash liquor from calcium oxalate precipitation was diluted to a specific gravity of 1.10. The solution was then heated to 45° C. and 227.5 grams of hydrated lime were added. The mixture was then agitated for ten minutes at 65° C. after which 163 grams of calcium tartrate from a previous batch were added and the mixture was kept at 65° C. for a total of two hours with rapid agitation. The magma was then cooled to room temperature and, after a total precipitation time of 7.5 hours, it was reheated and kept at 65° C. for two hours. During the reheating there was added 22.8 grams of hydrated lime. The magma was again cooled to room temperature after the second two-hour heating period, and after 24 hours precipitation was reheated for two hours at 65° C., cooled to room temperature and finally filtered after approximately 42 hours total precipitation time. The total amount of lime added equalled the stoichiometric amount for the production of calcium oxalate and calcium tartrate plus enough to provide 31% neutralization of the residue acids. The cake was washed with distilled water at room temperature and dried under a vacuum at 70° C. A yield of 860 grams of hydrated calcium tartrates was obtained.

Removal of excess lime

The filtrate and wash liquor from the last precipitation were analyzed for calcium. This was done by precipitating a portion with oxalic acid, neutralizing with ammonia, filtering, dissolving the precipitate in sulfuric acid and titrating with potassium permanganate to yield the calcium oxalate equivalent. The solution was then heated to 65° C.; 155 grams of oxalic acid dihydrate equivalent to the calcium content required to form calcium oxalate were added, and the magma was stirred at a medium rate for one hour at 65° C. A precipitated calcium oxalate was then removed by filtration and the cake was washed with hot water and dried in a vacuum drier at 70° C. The yield was 175 grams calcium oxalate monohydrate.

Evaporation of residue

The filtrate and wash liquors from the calcium oxalate precipitation charges described were then evaporated under a vacuum to a water content of approximately 20 to 25%. The residue contained 257.2 grams of carbon.

It may be desired to precipitate oxalic and tartaric acids together. In this case, it is usually most economical to crystallize out oxalic acid per se first and then to precipitate the remainder of the oxalic acid and the tartaric acids together as mixed calcium oxalate and tartrates by adding the total quantity of lime. In either separate or mixed precipitation of calcium tartrates and calcium oxalate the crystallized oxalic acid may also be brought down as calcium oxalate, in which case, of course, an additional amount of precipitant, equivalent to the added amount of oxalic acid, must be employed.

Furthermore, the method of tartrate precipitation set forth in this specification will be found to be applicable regardless of the method of oxalic acid removal.

According to the method set forth in the above description, calcium separation of tartaric and oxalic acid values from an oxidized carbohydrate material solution may be efficiently performed. To obtain a practical precipitation it is obviously not always necessary that each of the described procedures be employed, although they all act together to produce the best results. Accordingly, the invention is to be considered as limited only by the claims.

By the term "carbohydrate" as used in the specification and claims is meant to be included not only compounds containing hydrogen and oxygen in the proportion of water but also other polyhydroxylic materials, such as hexitols, pentitols, erythritol, sugar acids, including aldonic and ketonic acids, and materials readily hydrolyzable to these. Such materials are now commonly classed with carbohydrates. Carbohydrates readily hydrolyzable by acid to other starting materials are equivalent to those materials. Among such materials are included oligo- or polysaccharides, such as starch, dextrin, corn syrup, sucrose, and high test molasses (partially inverted raw cane sugar) which readily hydrolyze to hexoses.

What is claimed is:

1. A process for the removal of oxalic and tartaric acids from an aqueous solution resulting from the nitric acid oxidation of carbohydrate materials, which comprises cooling the solution, removing crystallized oxalic acid, adding to the solution lime in a quantity in excess of, but less than double, the stoichiometric amount necessary for the formation of calcium oxalate from all the residual oxalic acid present, removing precipitated calcium oxalate, providing the water content of the solution such that it has a specific gravity less than 1.15, adding to the solution lime in a quantity sufficient that the solution contains an amount of calcium precipitant equal to the stoichiometric amount necessary for the formation of calcium tartrates from all tartaric acids present and, in addition, an amount equal to from about 30% to about 35% of the stoichiometric amount necessary to form calcium salts of all the less highly oxidized acids present, heating the solution to a temperature of from about 60° C. to about 70° C., cooling solution, reheating the solution to a temperature of from about 60° C. to about 70° C., cooling the solution, and removing the precipitated calcium tartrates.

2. A process according to claim 1 wherein the first heating step is conducted from about 1 to about 3 hours, the reheating step is conducted for a period of about 1 to 3 hours, and the total precipitation time is at least about 35 hours.

RALPH A. HALES.

REFERENCES CITED

The following references are of record in the file of this patent:

UNITED STATES PATENTS

| Number | Name | Date |
|---|---|---|
| 217,235 | Muller | July 8, 1879 |
| 1,000,433 | Moszczenski | Aug. 15, 1911 |
| 1,278,257 | Tobler | Sept. 10, 1918 |
| 2,303,602 | Braun | Dec. 1, 1942 |
| 1,870,472 | Stokes et al. | Aug. 9, 1932 |
| 1,425,605 | Odell | Aug. 15, 1922 |
| 2,257,284 | Stokes et al. | Sept. 30, 1941 |